United States Patent [19]

Moran

[11] 4,195,311

[45] Mar. 25, 1980

[54] COHERENCE LENGTH GATED OPTICAL IMAGING SYSTEM

[75] Inventor: Steven E. Moran, Lakeside, Calif.

[73] Assignee: The United States of America as represented by the Secretary of the Navy, Washington, D.C.

[21] Appl. No.: 937,655

[22] Filed: Aug. 28, 1978

[51] Int. Cl.$^2$ ............................................... H04N 7/18
[52] U.S. Cl. ..................................... 358/95; 358/99; 356/5; 356/349
[58] Field of Search ................ 250/199; 358/95, 99, 358/90; 356/5, 349, 360; 313/381

[56] References Cited

U.S. PATENT DOCUMENTS

| | | | |
|---|---|---|---|
| 2,541,374 | 2/1951 | Morton | 313/381 |
| 3,426,207 | 2/1969 | Fried et al. | 250/199 |
| 3,566,021 | 2/1971 | Jakes, Jr. | 250/199 |
| 3,669,541 | 6/1972 | Duguay | 250/199 |
| 3,670,098 | 6/1972 | Korpel | 356/349 |
| 3,676,003 | 7/1972 | Naiman et al. | 356/4 |
| 3,682,553 | 8/1972 | Kapany | 358/95 |
| 3,899,250 | 8/1975 | Bamberg et al. | 358/95 |
| 4,129,780 | 12/1978 | Laughlin | 356/5 |

Primary Examiner—Richard Murray
Assistant Examiner—Joseph A. Orsino, Jr.
Attorney, Agent, or Firm—Richard S. Sciascia; Ervin F. Johnston; James O. Skarsten

[57] ABSTRACT

An apparatus for providing an image of an object, a diffusive medium being located between the apparatus and the object, the apparatus including a coherent light source for projecting a beam of coherent light through the diffusive medium onto various light reflective parts of the object. The coherence length of the projected beam is preferably very short, and each reflective part of the object is located in one of one or more discrete viewing spaces, the depth of field of the apparatus being equal to the coherence length of the projected light. A photocathode or the like is provided for receiving light reflected back through the diffusive medium from the reflective parts, discrete incremental sections of the photo-cathode responding to received light by generating sets of light responsive signals. Each set corresponds to a different viewing space, and the light responsive signals of a given set represent an image of the light reflective parts of the object which are located in the viewing space to which the given set corresponds. Integrating apparatus is provided to combine the light responsive signals of the sets to provide an image of the object.

11 Claims, 2 Drawing Figures

COHERENCE LENGTH GATED OPTICAL IMAGING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains to a system for optical heterodyne imaging. More particularly, the invention pertains to an optical heterodyne imaging system for viewing an object through a medium or environment containing diffused refractive particles. Even more particularly, the invention pertains to such systems which illuminate an object to be viewed with coherent light having a very short coherence light to overcome the degrading effects of forward scatter and back scatter.

The range at which an optical system viewing an object through a diffusive medium may form an image of the object is substantially limited by the phenomenon of forward scatter, and if the object is illuminated by light projected from the viewing system, by the phenomenon of back scatter. A diffusive medium is a medium such as fog or seawater which contains refractive diffused particulate matter. Forward scatter is the scattering of light transmitted from a viewed object to a viewing system as the result of random refractions by the particles, where some of the scattered light is sensed by the viewing system. While some of the light transmitted from the object will reach the viewing system without interacting with any particles, and will therefore provide a clear image of the object, the sensed scattered light will degrade the image at the photodetector of the system. If the viewing system is more than a limited distance from the object, the scattered light will cause the image to be totally unviewable.

Forward scatter generally becomes a significant problem at distances which exceed 10 attenuation lengths, and makes an object completely unviewable at 15 attenuation lengths. For example, if seawater contains a large concentration of certain refractive microorganisms, a conventional viewing device such as a television camera would be unable to distinguish an object located more than 15 attenuation lengths away.

Back scatter is the scattering of light projected from a source of light by refractive particles of a diffusive medium, where some of the scattered light is directed back toward the source. It is clear that back scatter will further degrade an image of an object which is viewed by a system which must provide illumination for the object.

Some techniques are presently available for overcoming the detrimental effects of back scatter in a diffusive medium such as seawater. For example, volume scanning or range gating may be employed. As far as is known, the only means for overcoming forward scatter in a dynamic diffusive medium, i.e., a medium in which the particles are in continuous random motion, is an invention by Applicant, disclosed in a previously filed patent application entitled "Optical Heterodyne System for Imaging in a Dynamic Diffusive Medium", filed with the U.S. Patent and Trademark Office under Ser. No. 930,283 on Aug. 2, 1978. As far as is known, no conventional systems or techniques are presently available for overcoming forward scatter in a diffusive medium in which the particles do not move.

SUMMARY OF THE INVENTION

The present invention discloses an apparatus for providing an image of an object from coherent light transmitted to the apparatus through a diffusive medium from various parts of the object, each part of the object from which light is transmitted being located in one of one or more discrete viewing spaces, the depth of field of the apparatus being equal to the coherence length of the transmitted light. The coherence length of the transmitted light is intended to be very short in comparison with the range of the object from the apparatus, the ratio therebetween being, for example, in the range of $10^{-4}$.

In this application, the viewing space of a viewing system such as an apparatus embodying the invention claimed herein is defined as the portion of object space, located at a selected range from the viewing system, in which all light generating events which may be perceived by the viewing system are located. The linear dimension of the viewing space taken along the range axis is the depth of field of the viewing system. Light generating events, including light projection, light reflection, and light refraction which are not located in the viewing space are not perceived by the viewing system, even if the range from the viewing system thereto is less than the range from the viewing system to the viewing space.

An apparatus of the invention also includes means for receiving transmitted light, and means responsive to light received by the receiving means for generating sets of light responsive signals, each of the sets corresponding to a different one of the viewing spaces, the light responsive signals of a given one of the sets representing an image of the light transmitting parts of the object which are located in the viewing space to which the given set corresponds. The apparatus further includes integrating means for combining the light responsive signals of each of the sets to provide a complete image of the object.

Preferably, the transmitting parts of the object comprise various light reflective surfaces on the outer surface of the object which are small enough in area to be located in one of the aforementioned viewing spaces. The apparatus includes a coherent light source which projects an illuminating beam of coherent light onto the reflective surfaces through the diffusive medium, and the projected light is reflected back through the diffusive medium to the receiving means. By providing such source, the coherence length of light which is transmitted from the object of the apparatus can be readily selected to provide light of very short coherence length. The distance which a wavefront of light from the source travels through the diffusive medium to the object and then back to the receiving means of the apparatus, without interaction with or interference by refractive particles in the media, comprises a first optical path length.

Preferably also, some of the light from the source is diverted by beam splitting means through an optical delay means which variably delays light passing therethrough. Diverted light is also passed through a frequency shifting means to shift the frequency thereof by an amount equal to an intermediate frequency which is in a range of electronic frequencies, that is, in a frequency range at which conventional electronic equipment is operable. The frequency shifted light comprises a local oscillator coherent light signal which is sequentially focused within an Airy disc on each of the light sensitive surfaces in an array of light sensitive surfaces included in the receiving means to generate a set of light responsive signals. The distance which a wavefront of light from the source travels through the optical delay means and the frequency shifting means to the receiving means comprises a second optical path length.

To provide a set of light responsive signals which represent an image of the light reflective surfaces of the object which are located in a particular viewing space which is at a particular range from the receiving means, the optical delay means is set so that the second optical path equals the distance light travels from the source to a point located within the particular viewing space, and then from the point back to the receiving means.

In a preferred embodiment, the receiving means comprises the detector plane of the photocathode of an image dissector, discrete sections of the photocathode comprising discrete light responsive elements from which electron streams are directed through an aperture in the drift tube of the image dissector to an electron multiplier. A synchronous control means is provided, which comprises a minicomputer programmed to sequentially focus the local oscillator coherent light signal on each light responsive element during a frame generation period. Also, the control means directs the electron stream generated by a light responsive element through the aperture to the electron multiplier when the local oscillator coherent light signal is focused thereupon. At the conclusion of the frame generation period, the synchronous control means varies the optical delay means to change the second optical path length by a distance equal to the coherence length of the light projected by the source.

In another embodiment, the present invention comprises a method for providing an image of an object by viewing through a diffusive medium. The method comprises the steps of projecting an illuminating beam of coherent light from a light source through the diffusive medium onto reflective surfaces of the object, each of the reflective surfaces being located in one of one or more discrete viewing spaces, the linear dimension of each of the viewing spaces which is taken along the axis of the projected light beam being equal to the coherence length of the projected light beam; receiving light of the projected light beam which is reflected through the diffusive medium from the reflective surfaces; generating sets of light responsive signals in response to the received light, each of the sets corresponding to a different one of the viewing spaces, the light responsive signals of a given one of the sets representing an image of the reflective surfaces of the object which are located in the viewing space to which the given set corresponds; and combining the light responsive signals of each of the sets to provide an image of the object.

OBJECTS OF THE INVENTION

An object of the present invention is to provide a new and improved system for eliminating or substantially reducing the degrading effects of forward scatter and back scatter on a system for viewing an object through a diffusive medium.

Another object is to provide a system for viewing an object through a diffusive medium which sequentially views different parts of surface areas of an object included in different narrow viewing spaces, the system then integrating or combining such partial views to provide a complete image of the object.

Another object is to provide a system for obtaining an image of an object through a diffusive medium which employs an optical heterodyne technique to sense light transmitted to the system from the vicinity of the object, and for screening out light transmitted to the system from elsewhere.

These and other objects of the invention will become more readily apparent from the ensuing specification when taken together with the drawings.

BRIEF DESCRIPTION OF THE DRAWINGS

FIG. 2 also illustrates the narrow depth of field of the embodiment of FIG. 1 in viewing the object.

DESCRIPTION OF THE PREFERRED EMBODIMENT

Figure 1:
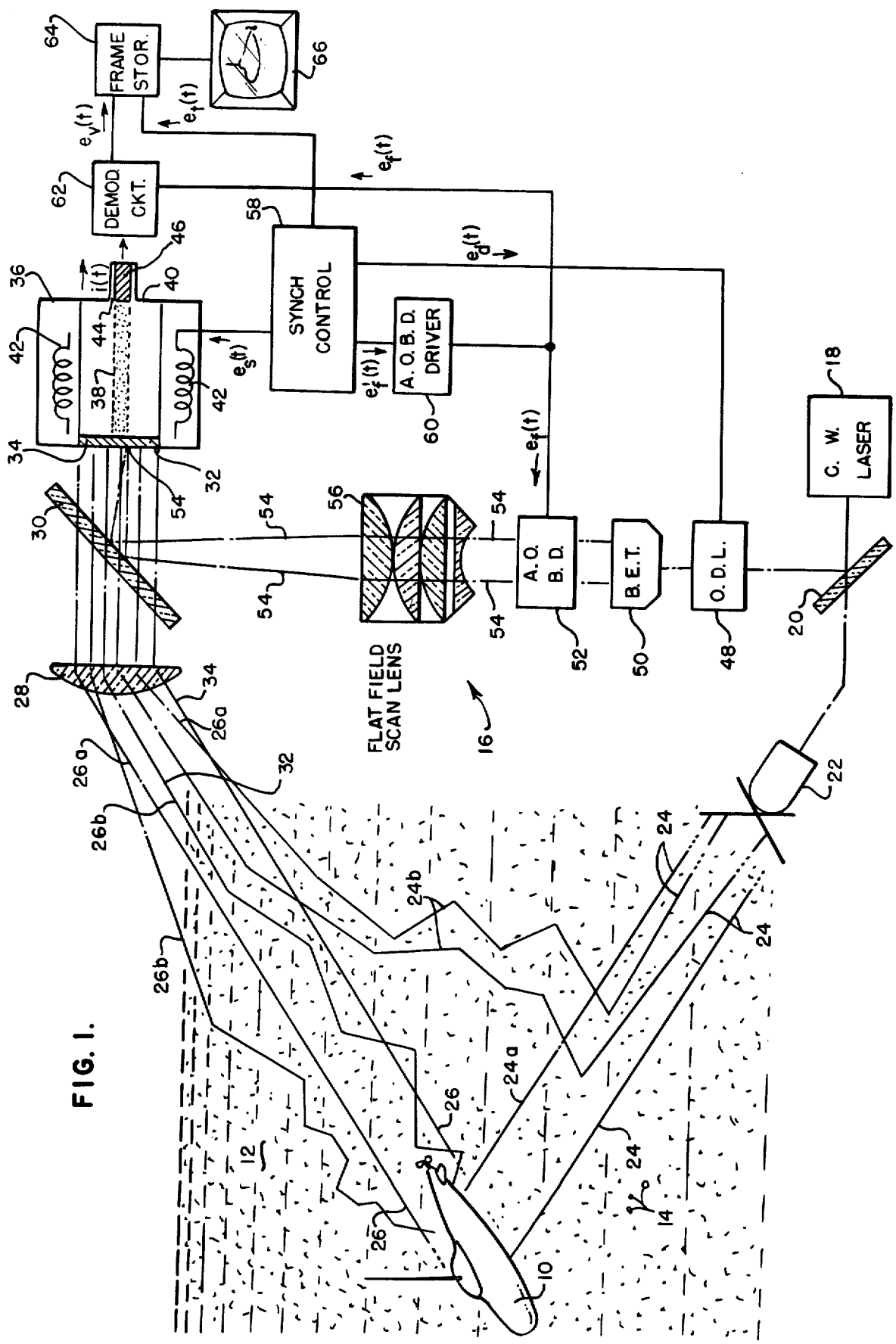
FIG. 1 shows a block diagram of an embodiment of the invention and of an object to be viewed or imaged by the embodiment through a diffusive medium.

Referring to FIG. 1, there is shown an object such as a submarine 10 located in a medium 12, such as a body of seawater which contains a diffusion of refractive particles 14. For example, particles 14 may comprise micro-organisms in a heavy concentration of a type of micro-organism which is known to refractively scatter light passing therethrough. Apparatus 16, for viewing submarine 10, is also located in medium 12, and is provided with continuous wave laser 18.

Laser 18 is operated multimode so that the bandwidth thereof, $\Delta \nu$, is in the range of $10^{10}$ Hz. It is desired to generate light having a very high bandwidth, so that coherent light projected by laser 18 will have a very short coherence length $L_c$, $L_c$ being approximately equal to the speed of light divided by $\Delta \nu$. The importance of short coherence length for the operation of apparatus 16 will be more clearly stated hereinafter.

Light from laser 18 is coupled through beam splitter 20 to microscopic objective lens 22, which is oriented toward submarine 10 so that coherent light beam 24 from laser 18 is projected toward submarine 10. Since the light of beam 24 has a bandwidth of $10^{10}$ Hz, the coherence length thereof is approximately 1 cm. and is infinitesimal in comparison with the range R of submarine 10 from apparatus 16. Light of beam 24 is projected with sufficient power to travel a distance of 15 attenuation lengths through medium 12, the range or distance of submarine 10 from apparatus 16, and to be reflected from submarine 10 back to apparatus 16. An attenuation length is the length at which the unscattered power drops to $e^{-1}$ of its initial value.

Light beam 24a of FIG. 1 represents light of projected beam 24 which passes between the particles 14 without interaction therewith or refraction thereby. Light 24b, on the other hand, represents light of projected beam 24 which has been scattered by particles 14 and has been refracted back to viewing apparatus 16, light 24b therefore representing the phenomenon of back scatter.

Referring further to FIG. 1, there is shown a beam or signal of coherent light 26 projected from submarine 10 toward apparatus 16 through medium 12, light beam 26 comprising some of the light of light beam 24a which is reflected from various reflective surfaces of submarine 10 back toward apparatus 16, an undistorted image of submarine 10 thereby being carried on the wavefront or field of beam 26. Coherent light beam 26a represents a component of reflected light beam 26 which travels from submarine 10 to lens 28 of apparatus 16 without being refracted by or interacting with any of the particles 14 in medium 12. Consequently, coherent light beam 26a carries an undistorted image of submarine 10 upon its wavefront, and has a coherence length of 1 centimeter, the coherence length of light projected by laser 18.

Light 26b represents another component of light received through lens 28, i.e., light of beam 26 which is refracted, or forward scattered, by particles 14. It will be readily apparent that, while coherent light beam 26a carries upon its wavefront a clear and undistorted image of submarine 10, such image will be highly degraded at apparatus 16 by back scattered light 24b and forward scattered light 26b.

Lens 28 focuses light components 26a, 24b and 26b, through beam splitter 30, upon the detector plane 32 of photo cathode 34 of image dissector 36. Image dissector 36 may comprise an apparatus which is well known in the field, such as a Vidisector camera manufactured by the Aerospace Optical Division of ITT. Hereinafter, to aid in understanding the operation of the embodiment of FIG. 1, photo cathode 34 shall be considered to comprise an array of discrete incremental sections, or light responsive elements, and the portion of detector plane 32 included in a light responsive element shall be considered to comprise a discrete light sensitive surface. As is well known in the operation of image dissectors, the light impinging upon an incremental area, or light sensitive surface, of detector plane 32 causes an electron stream 38 to be projected into drift tube 40 of the image dissector, the amplitude and frequency of the electron stream being determined by the impinging light. Coils 42, positioned around drift tube 40 are selectively energized by a signal $e_x(t)$ to direct a particular electron stream 38 through an aperture 44 of selected area to an electron responsive device, such as a dynode chain or other electron multiplier 46. In response to a particular electron stream 38, multiplier 46 generates current i(t) which represents the electron stream, and which therefore represents light impinging upon the light sensitive surface of the light responsive element generating the particular electron stream.

Figure 2:
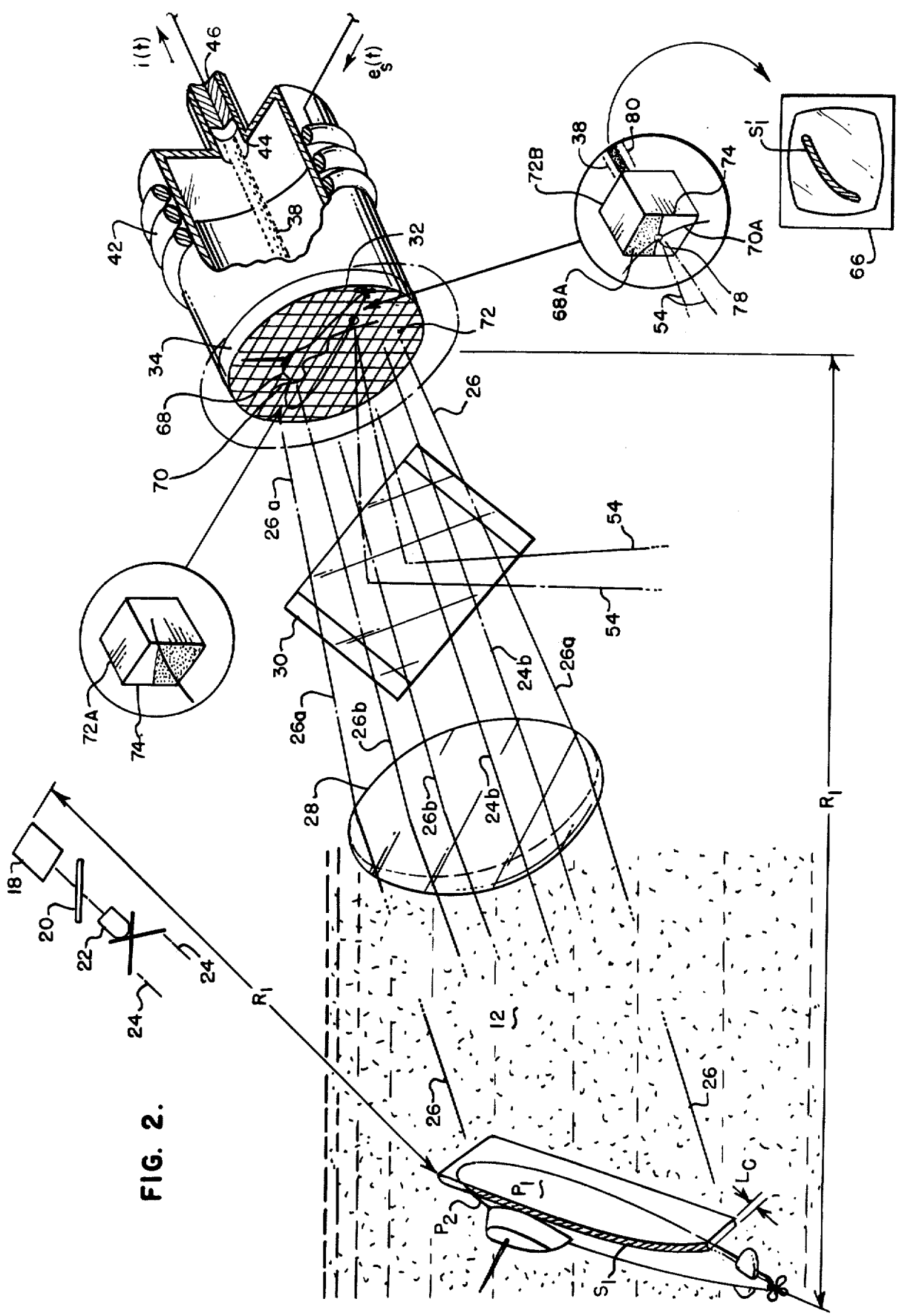
FIG. 2 is a perspective view showing an image dissector tube for the embodiment of FIG. 1 having a portion broken away.

The division of photocathode 34 into an array of light responsive elements is illustrated in FIG. 2. The area of each light sensitive surface is equal to the area of aperture 44, since aperture 44 determines the cross section of an electron stream 38 which may pass therethrough to multiplier 46. Aperture 44 may usefully be circular and have a diameter of 200 microns.

Referring once more to FIG. 1, there is shown light from laser 18 diverted through variable optical delay line 48 by beam splitter 20, and coupled from delay line 48, through beam expanding telescope 50, to acousto-optic beam deflector 52. Beam deflector 52 shifts the frequency of the light of laser 18 to provide a local oscillator coherent light signal 54 having a frequency which is greater or less than the frequency of light provided by laser 18, the difference being equal to an intermediate frequency which is in the range of 10 MHz-100 MHz. Local oscillator signal 54 is focused by flat field scan lands 56, and reflected by beam splitter 30, so that most of the light of local oscillator 54 impinges upon detector plane 32 within an Airy disc of 2 microns diameter. The position of the Airy disc on detector plane 32 is determined by deflection of local oscillator signal 54 by beam deflector 52.

Variable optical delay line 48 is a conventional device, and is provided to vary the optical path length of a wavefront of light from laser 18 which passes through delay line 48, beam expanding telescope 50, beam deflector 52, and scan lens 56 to detector plane 32. Such optical path length is hereinafter referred to as the optical path length of the local oscillator coherent light signal 54. The optical delay provided by delay line 48 is determined by a signal $e_d(t)$ coupled thereto from synchronous control 58, whereby synchronous control 58 determines and may selectively vary the optical path length of local oscillator signal 54.

Beam sxpanding telescope 50 usefully comprises a BET 25, manufactured by Jodon. Acousto-optic beam deflector 52 is a well-known device which has the capability of introducing the aforementioned frequency shift, and usefully comprises a device such as the acousto-optic laser beam deflector scanner, model LV401, manufactured by ISOMET.

In addition to performing the above frequency shifting function, beam deflector 52 also selectively deflects local oscillator signal 54, in response to an electric driving signal $e_f(t)$ coupled thereto from acousto-optic beam deflector driver 60. Driver 60, comprising a conventional electronic circuit used in conjunction with beam deflector 52, provides driving signals $e_f(t)$ that cause the two micron Airy disc of local oscillator signal 54 to be sequentially focused upon the light sensitive surfaces of each of the light responsive elements comprising photo cathode 34 during each of a succession of frame generation periods. The operation of driver 60 is in turn controlled by signals $e'_f(t)$ which are coupled thereto from synchronous control 58. Signals $e'_f(t)$ therefore control both the sequence in which the local oscillator signal 54 is focused on each of the light sensitive surfaces of the photo cathode, and the dwell time period, or time that the local oscillator is focused on a given light sensitive element.

When a given signal $e_f(t)$ causes the Airy disc of local oscillator signal 54 to be focused upon a given light responsive element, heterodyning or mixing will occur between local oscillator signal 54 and a component of light impinging upon the light sensitive surface of the given light responsive element if a certain critical relationship, hereinafter discussed, exists between the wavefronts of the light component and local oscillator signal 54. The heterodyning or mixing causes a heterodyned electron stream of two microns diameter to be included in an electron stream 38 projected into drift tube 40, the heterodyne electron stream having a frequency equal to the aforementioned intermediate frequency and representing the light component. If the heterodyned electron stream is received by multiplier 46, a current i(t) is generated thereby which likewise represents the light component. The current i(t) is coupled to a conventional video demodulation circuit 62, which is referenced to the intermediate frequency by driver 60 and provides the information of current i(t) in a video signal $e_v(t)$. The video signal is coupled through frame storage 64 to television display 66, which provides a viewable image of the light component.

To provide an entire frame, or viewable image, of all of the light impinging upon detector plane 32 which has the aforementioned critical relationship with local oscillator 54, synchronous control 58 generates sets of corresponding signals $e'_f(t)$ and $e_s(t)$ during a frame generation period of about 1/30 second, the integration time of the human eye. Successive signals $e'_f(t)$ cause local oscillator signal 54 to be sequentially focused on each of the light sensitive surfaces comprising detector plane 32 for a selected dwell time period as aforementioned. When a given signal $e'_f(t)$ focuses the local oscillator signal on a given light sensitive surface, coils 42 are energized to direct the electron stream 38 generated by the light responsive element of the surface through aperture 44 in response to the signal $e_s(t)$ corresponding to the given signal $e'_f(t)$.

Frame storage 64 is a conventional device for storing the video signals generated during a frame generation period in response to a signal $e_f(t)$ from synchronous control 58.

A system for optical heterodyne imaging in general is disclosed in a copending patent application of Applicant, entitled "Scanning Focused Local Oscillator Heterodyne System", Ser. No. 921,663 filed July 3, 1978 in the U.S. Patent Office.

As aforementioned, various components of light simultaneously impinge upon detector plane 32, including component 26a which provides an undistorted image of submarine 10, component 24b resulting from back scattering events occurring in medium 12 between projector 22 and submarine 10, and component 26b resulting from forward scattering events occurring in medium 12 between submarine 10 and lens 28. However, in optical heterodyning, mixing will only occur between a local oscillator signal and a received coherent light component if the wave front of the light component matches or is correlated with the wavefront of the local oscillator signal to within a coherence length of the light of the local oscillator signal. For the system of apparatus 16, heterodyning occurs only between local oscillator signal 54 and a component of light received upon detector plane 32 if the wavefront of the received light traverses an optical path length which is equal to the optical path length of the local oscillator signal, to within a coherence length $L_c$ of the light of laser 18.

By splitting light from laser 18 to generate both local oscillator signal 54 and light beam 26a, respective wavefronts thereof may be matched by selectively adjusting optical delay line 48. Delay line 48 is adjusted so that the optical path length of a wavefront of local oscillator signal 54 is equal, to within $L_c$, to the distance traversed by the same wavefront in traveling from beam splitter 20 to various reflective surfaces of submarine 10, and therefrom back to detector plane 32, the traveling wavefront experiencing no scattering events by medium 12. If $L_c$ is made sufficiently small, light reflected from only some of the reflective surfaces which generate light beam 26a will be matched to local oscillator signal 54, and apparatus 16 will be able to provide an image of only a portion of the reflective surfaces of submarine 10 for a given adjustment of delay line 48. Stated another way, the depth of field of apparatus 16 is equal to $L_c$. By making $L_c$ very small, the viewing space of apparatus 16 is so narrow that only a portion of the reflective surfaces of submarine 10 can be located therein. Also, all of the back scatter, and nearly all of the forward scatter events occurring in the space between submarine 10 and apparatus 16 will be outside of the viewing space thereof, and will therefore not be perceived thereby. The forward scatter discrimination of apparatus 16 is inversely proportional to coherence length $L_c$.

Referring to FIG. 2, there are shown, for illustration purposes, planes $P_1$ and $P_2$ passing through submarine 10. $S_1$, a portion of the outer surface of submarine 10 from which light beam 26 is reflected toward apparatus 16, is included therebetween. Planes $P_1$ and $P_2$ are orthogonal to the axis of reflected light beam 26, the spacing therebetween being equal to $L_c$, and the volume therebetween comprising the viewing space of apparatus 16 for a particular adjustment of delay line 48. Plane $P_1$ is situated at a range $R_1$ from both detector plane 32 and laser 18. All light traveling from laser 18 to surface $S_1$ and therefrom to detector plane 32 therefore has an optical path length $R_2$, $2R_1 \leq R_2 \leq 2R_1 + L_c$. Consequently, by adjusting optical delay line 48 so that the optical path length of local oscillator signal 54 is $2R_1$, the only components of light beams 24 and 26 which will be heterodyned with local oscillator signal 54, and which will therefore be displayed by display 66, will be light reflected from surface $S_1$, light which has been back scattered or forward scattered within the volume between planes $P_1$ and $P_2$, and light forward scattered in the space between submarine 10 and apparatus 16 which has an optical path length $R_2$ by coincidence. However, as aforementioned, the coherence length $L_c$ is very small, i.e., 1 cm. Therefore, there are too few of such scattering events to significantly degrade an image of surface $S_1$ of submarine 10, which apparatus 16 provides by mixing signal 54 with the portion of light beam 26a reflected from surface $S_1$.

To obtain a complete view of submarine 10, synchronous control 58 of FIG. 1 provides a signal $e_d(t)$ at the end of each of a succession of frame generation periods to delay line 48, each such signal increasing the optical path length of the local oscillator signal by $L_c$. At the conclusion of each frame generation period, control 58 couples a signal $e_f(t)$ to storage 64 so that the frame derived by optical heterodyning during the period is stored in frame storage 64. At the conclusion of the succession of frame generation periods, each of the frames, comprising images of small adjacent strips of a complete image of submarine 10, are simultaneously displayed by television display 66 to provide a complete image of the viewed object.

In one application of apparatus 16, synchronous control 58 alternatively operates apparatus 16 in a search mode and in an image scan mode. During a search mode, a frame is generated for each increase of the local oscillator path length by $L_c$, the viewing space of apparatus 16 being thereby moved outward from apparatus 16 in increments of $L_c$. Each frame not including a portion of a subject of search is excluded from storage in frame storage 64. Upon detecting a frame which includes a portion of a subject of search, apparatus 16 goes into a scan mode, all of the frames generated thereafter being stored in storage 64 until a complete image of the subject may be provided therefrom.

Referring further to FIG. 2, there is shown an image 68 of submarine 11 which is carried upon the wavefront of reflected coherent light beam 26a and which is focused by lens 28 upon detector plane 32 of photo cathode 34 as previously described. From the above discussion, it will be apparent that light beam 26a may be considered to comprise a number of light components, which are directed to photo cathode 34 from ranges varying incrementally by an amount equal to $L_c$, and only one of which is heterodyned during a given frame generation period. FIG. 2 also shows forward scattered and back scattered light 70 impinging upon detector plane 32.

A grid has been superimposed upon detector plane 32 in FIG. 2 to illustrate an array of discrete light responsive elements 72 which comprise photo cathode 34, a light responsive element 72A being broken away from photo cathode 34 for purposes of illustration. As aforementioned, each light responsive element comprises the section of photocathode 34 from which a stream of electrons 38 is projected to aperture 44 to multiplier 46 when a unique coil deflection signal $e_s(t)$ is coupled to coils 42.

FIG. 2 also shows light responsive element 72B broken away from photocathode 34. Reference numeral 68A refers to a portion of image 68 impinging upon element 72B, and reference numeral 70A represents a portion of scattered light 70 impinging thereupon. When local oscillator signal 54 is focused within an Airy disc 78 upon the light sensitive surface 74 of element 72B an electron stream 38 is generated thereby, electron stream 38 including heterodyned electron stream 80, which represents a picture element of an image $S_1'$ of surface $S_1$ if delay line 48 is adjusted so that the local oscillator optical path length is $2R_1$.

Synchronous control 58 usefully includes a mini computer system which is conventionally programmed to provide selected time durations for the frame generation and dwell time periods, and also to provide a selected number of frame generation periods. The sequence in which local oscillator signal 54 is focused upon respective light sensitive surfaces of detector plane 32 is also programmed thereinto. It will be readily apparent that by decreasing the coherence length of laser 18, the resolution of apparatus 16 may be improved. However, the number of frame generation periods must therefore be increased to provide the same image, whereby the time required to generate an image is increased. Resolution is also affected by the size of aperture 44, which determines the size and number of the light sensitive surfaces of detector plane 32.

Obviously, many modifications and variations of the present invention are possible in the light of the above teachings, and, it is therefore understood that within the scope of the disclosed inventive concept, the invention may be practiced otherwise than as specifically described.

What is claimed is:

1. Apparatus for overcoming scatter interference in viewing an object through a diffusive medium, said apparatus comprising:
    source means for providing a coherent light signal of selected coherence length;
    means receiving a first component of said provided coherent light signal for projecting said first component through said diffusive medium to said object;
    means positioned to receive a portion of said first component of said coherent light signal which is reflected by said object back through said diffusive medium, said portion comprising a received coherent light signal;
    means receiving a second component of said provided coherent light signal for shifting the frequency of said second component by a selected amount to provide a local oscillator coherent light signal;
    means optically coupled to said receiving means and said frequency shifting means for heterodyning said local oscillator coherent light signal with light of said received coherent light signal during each time period in a succession of time periods to provide successive sets of discrete heterodyne signals, the heterodyne signals of one of said sets together representing reflective surfaces of said object which are included in a viewing space having a linear dimension which is on the order of said coherence length of said provided coherent light signal; and
    optical delay means lying on the optical path traversed by said local oscillator coherent light signal for changing the length of said optical path by a distance on the order of the coherence length of said provided coherent light signal at the conclusion of each of said time periods.

2. The apparatus of claim 1 wherein:
    said source means comprises means for generating a continuous coherent light signal of selected coherence length;
    said projecting means comprises means for continuously illuminating a diffusive object with light of said generated coherent light signal;
    said receiving means comprises means for continuously receiving light of said generated coherent light signal which is reflected by said diffusive object back through said diffusive medium; and
    an integrating means is coupled to said heterodyne means for combining the heterodyne signals of said successive sets to provide an image of said object from which scatter interference caused by coherent light traversing said diffusive medium has been removed.

3. The apparatus of claim 2 wherein said heterodyne means comprises:
    an array of discrete light responsive elements, each of said light responsive elements having a light sensitive surface and comprising means for generating an electric signal which represents the light impinging upon its light sensitive surface;
    lens means for focusing said received coherent light signal upon said array so that each of said discrete light responsive elements receives a different picture element in a set of picture elements carried by said received coherent light signal, said set of picture elements together comprising an image of the reflective surfaces of said object that are included in one of said viewing spaces; and
    means for focusing said local oscillator coherent light signal in an Airy disc upon each of said light sensitive surfaces in a preselected sequence during one of said time periods to produce one of said sets of heterodyne signals, said local oscillator coherent light signal being focused upon a given light sensitive surface for a dwell time period of preselected duration in a sequence of dwell time periods, said sequence of dwell time periods comprising one of said time periods.

4. The apparatus of claim 3 wherein said integrating means comprises:
    means for storing each of said sets of heterodyne signals which represents light reflective surfaces of said object; and
    means receiving each of the heterodyne signals of said stored sets for providing a visual display of an image of said object at the conclusion of said succession of time periods.

5. Optical hetrodyne imaging apparatus for viewing a diffusive object when a light scattering diffusive medium is located between said apparatus and said object, said apparatus comprising:
- means for projecting a continuous coherent light signal of selected coherence length to said object through said medium, a portion of said coherent light being reflected from said diffusive object back to said apparatus through said medium;
- photocathode means having a detector plane which comprises an array of light sensitive surfaces;
- lens means positioned to continuously focus said reflected light upon said array of light sensitive surfaces;
- frequency shifting means receiving light from said light projecting means for providing a local oscillator coherent light signal, the frequencies of light projected by said light projecting means and of said local oscillator signal being different, said difference being equal to an intermediate frequency;
- means for sequentially focusing said local oscillator coherent light signal within an Airy disc on each of said light sensitive surfaces during a frame generating period in a succession of frame generating periods to generate a set of electron streams, each of said electron streams including a heterodyne component which represents the heterodyning of said local oscillator coherent light signal with a portion of said focused reflected coherent light signal.
- optical delay means receiving said local oscillator coherent light signal for changing the optical path length of said local oscillator coherent light signal at the conslusion of each of said frame generating periods by a distance equal to the coherence length of said projected coherent light signal and;
- integrating means receiving said electron streams for providing a viewable image of said object at the conclusion of said succession of frame generating periods.

6. The apparatus of claim 5 wherein said integration means comprises:
- means receiving electron streams of one of said sets during a frame generation period for providing a frame representation signal which represents a viewable frame, said viewable frame comprising an image of the parts of said object which are located in a viewing space of said apparatus, the linear dimension of said viewing space taken along the range axis between said apparatus and said object being equal to the coherence length of light from said light projecting means;
- means for storing a number of said frame representation signals until the conclusion of said succession of frame generating periods, the number of stored frame representation signals being equal to the number of frame generating periods in said succession; and
- video display means coupled to said storing means for combining the images of all of said viewable frames to provide a visual display of said object.

7. The apparatus of claim 6 wherein said means for providing frame representation signals comprises:
- a drift tube joined to said photocathode means, said generated electron streams being projected into said drift tube;
- means for sequentially directing each of said generated electron streams through an aperture of selected area in said drift tube; and
- electron multiplier means receiving each of said electron streams directed through said aperture for providing an electric current which represents said electron streams.

8. The apparatus of claim 7 wherein:
- said frequency shifting means includes an acousto optic beam deflector means receiving light from said light projecting means, said acousto optic beam deflector means being driven to focus said local oscillator coherent light signal on each of said light sensitive surfaces for a selected dwell time period in a preselected sequence during each of said frame generation periods; and
- said apparatus includes synchronous control means for changing the optical path length provided by said optical delay means at the conclusion of each of said frame generation periods, for driving said acousto optic beam deflector means during each frame generation period, and for operating said electron stream directing means to direct a particular electron stream through said aperture to said electron multiplier means when said local oscillator coherent light signal is focused on a particular light sensitive surface, the particular electron stream representing light impinging upon the particular light sensitive surface.

9. The apparatus of claim 8 wherein:
- said synchronous control means comprises a mini computer means into which the number and time duration of said frame generation periods, the duration of said dwell time periods, and the sequence of focusing of said local oscillator coherent light signal during each of said frame generation periods has been programmed.

10. The apparatus of claim 7 wherein:
- said focusing means comprises means for focusing said local oscillator coherent light signal on each of said light sensitive surfaces within an Airy disc having an area which is in the range of 1/100th of the area of said aperture.

11. A method for viewing an object through a diffusive medium comprising the steps of:
- projecting a continuous beam of coherent light from a source of coherent light through said diffusive medium onto reflective surfaces of said object;
- continuously receiving light of said projected light beam which is reflected through said diffusive medium from said reflective surfaces;
- focusing said continuously received coherent light upon a light sensitive surface of each light responsive element in an array of light responsive elements, each of said light responsive elements generating a signal which represents the light which impinges upon its light sensitive surface;
- shifting the frequency of a component of light from said source to provide a local oscillator coherent light signal;
- changing the optical path of said local oscillator coherent light signal by an amount equal to the coherence length of said source at the conclusion of each time period in a succession of time periods;
- focusing said local oscillator coherent light signal within an Airy disc on each of said light sensitive surfaces in a preselected sequence during one of said time periods to generate a set of discrete heterodyne signals, said heterodyne signals together representing an image of the light generating events which occur within a viewing space at a selected range from said selected location, the linear dimension of said viewing space which is measured along the axis of said projected light beam being equal to said coherence length of said source; storing generated sets of said discrete hetrodyne signals which represent viewing spaces in which reflective surfaces of said object are included; and excluding from storage other of said generated sets of discrete hetrodyne signals.

* * * * *